(12) United States Patent
Jacob Sushil et al.

(10) Patent No.: US 9,208,518 B2
(45) Date of Patent: Dec. 8, 2015

(54) GENERATING TARGETED GROUP BASED OFFERS TO INCREASE SALES

(71) Applicant: International Business Machines Corporation, Armonk, NY (US)

(72) Inventors: George T. Jacob Sushil, Bangalore (IN); Vinod V. Mankar, Bangalore (IN); Sougata Mukherjea, New Delhi (IN); Gopal S. Pingali, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/149,224

(22) Filed: Jan. 7, 2014

(65) Prior Publication Data

US 2014/0122218 A1    May 1, 2014

Related U.S. Application Data

(62) Division of application No. 12/967,181, filed on Dec. 14, 2010.

(51) Int. Cl.
*G06Q 30/00*    (2012.01)
*G06Q 30/02*    (2012.01)

(52) U.S. Cl.
CPC ........ *G06Q 30/0277* (2013.01); *G06Q 30/0207* (2013.01); *G06Q 30/0239* (2013.01)

(58) Field of Classification Search
CPC .......................... G06Q 30/207; G06Q 30/0207
USPC .......................................................... 705/14
See application file for complete search history.

(56) References Cited

U.S. PATENT DOCUMENTS

| 6,269,343 | B1 | 7/2001 | Pallakoff |
| 6,418,415 | B1 | 7/2002 | Walker et al. |
| 6,466,919 | B1 | 10/2002 | Walker et al. |
| 6,934,690 | B1 | 8/2005 | Van Horn et al. |

(Continued)

FOREIGN PATENT DOCUMENTS

| WO | 0043929 A2 | 7/2000 |
| WO | 0043938 A1 | 7/2000 |

(Continued)

OTHER PUBLICATIONS

"Tuangou," http://en.wikipedia.org/wiki/Tuangou, 2010, pp. 1-3.

*Primary Examiner* — Matthew L Hamilton
(74) *Attorney, Agent, or Firm* — Robert A. Voigt, Jr.; Winstead, P.C.

(57) ABSTRACT

A method, system and computer program product for increasing the sales of a retailer. A unit, referred to herein as the "retailer promotions device," generates a group offer for a set of users/customers to purchase a product based on intelligent analytics (e.g., real-time attributes/dynamics such as the strategy in selling the remaining inventory). A group offer refers to an offer to sell a product at a promotional price if a number of users (e.g., users of mobile devices and/or customers online and/or customers in a physical store) agree to purchase the product at the promotional price within a time period. The group offer is sent to targeted users/customers via online and mobile devices as well as via electronic displays and kiosks in the physical store. By using real-time attributes/dynamics to generate group offers that can be sent to targeted users/customers, the sales of the retailer are likely to be increased.

6 Claims, 6 Drawing Sheets

(56) References Cited

U.S. PATENT DOCUMENTS

| | | |
|---|---|---|
| 7,103,565 B1 | 9/2006 | Vaid |
| 7,146,330 B1 | 12/2006 | Alon et al. |
| 7,194,427 B1 | 3/2007 | Van Horn et al. |
| 7,263,498 B1 | 8/2007 | Van Horn et al. |
| 7,363,246 B1 | 4/2008 | Van Horn et al. |
| 7,480,627 B1 | 1/2009 | Van Horn et al. |
| 7,672,897 B2 | 3/2010 | Chung et al. |
| 2001/0049636 A1* | 12/2001 | Hudda et al. ............... 705/26 |
| 2002/0103746 A1 | 8/2002 | Moffett, Jr. |
| 2003/0004821 A1 | 1/2003 | Dutta et al. |
| 2003/0236710 A1 | 12/2003 | Tong et al. |
| 2005/0149391 A1* | 7/2005 | O'Shea et al. ............... 705/14 |
| 2006/0080265 A1 | 4/2006 | Hinds et al. |
| 2006/0129454 A1 | 6/2006 | Moon et al. |
| 2007/0112636 A1 | 5/2007 | Lucker, Jr. |
| 2007/0294134 A1 | 12/2007 | Yang |
| 2009/0198622 A1 | 8/2009 | Temte et al. |
| 2010/0179868 A1* | 7/2010 | Del Rosario ............ 705/14.16 |
| 2010/0318435 A1* | 12/2010 | Ramanathan et al. ......... 705/26 |
| 2011/0047012 A1 | 2/2011 | Sherman |
| 2011/0238472 A1 | 9/2011 | Sunkada |
| 2011/0320250 A1* | 12/2011 | Gemmell et al. ........ 705/14.16 |
| 2011/0320364 A1 | 12/2011 | Van Horn et al. |
| 2012/0016733 A1 | 1/2012 | Belvin et al. |
| 2012/0036001 A1* | 2/2012 | Mesaros ................. 705/14.25 |
| 2012/0054002 A1* | 3/2012 | Rotbard et al. ........... 705/14.3 |
| 2012/0078755 A1 | 3/2012 | Subbarao et al. |
| 2012/0109732 A1 | 5/2012 | Jaffe |
| 2012/0179516 A1 | 7/2012 | Fakhrai et al. |
| 2012/0197722 A1 | 8/2012 | Mesaros |
| 2012/0203650 A1 | 8/2012 | Burlin |
| 2013/0006747 A1 | 1/2013 | Wu |
| 2013/0013438 A1 | 1/2013 | Chen et al. |
| 2013/0024250 A1 | 1/2013 | Wu et al. |
| 2013/0046605 A1 | 2/2013 | Baron et al. |
| 2013/0046622 A1 | 2/2013 | Jennings |
| 2013/0054323 A1 | 2/2013 | Charles |
| 2013/0066695 A1* | 3/2013 | Just ....................... 705/14.16 |
| 2013/0097005 A1 | 4/2013 | Yang et al. |
| 2013/0110597 A1 | 5/2013 | Blair et al. |
| 2013/0132179 A1 | 5/2013 | Wu et al. |
| 2013/0132220 A1 | 5/2013 | Baum |
| 2013/0144689 A1 | 6/2013 | Phung |
| 2013/0166360 A1 | 6/2013 | Kshetramade et al. |
| 2013/0179258 A1 | 7/2013 | Moskos et al. |
| 2013/0218686 A1 | 8/2013 | Muchnik et al. |
| 2013/0218703 A1* | 8/2013 | Jakobson .................. 705/26.2 |
| 2013/0226693 A1 | 8/2013 | Qin et al. |
| 2013/0268331 A1 | 10/2013 | Bitz et al. |
| 2013/0268385 A1 | 10/2013 | Shih |
| 2013/0311315 A1* | 11/2013 | Zises ....................... 705/26.2 |
| 2013/0339123 A1* | 12/2013 | Ennis et al. ............. 705/14.26 |

FOREIGN PATENT DOCUMENTS

| | | |
|---|---|---|
| WO | 0045318 A1 | 8/2000 |
| WO | 0198997 A1 | 12/2001 |
| WO | 2009094385 A2 | 7/2009 |

\* cited by examiner

GENERATING TARGETED GROUP BASED OFFERS TO INCREASE SALES

CROSS-REFERENCE TO RELATED APPLICATIONS

The present application is a divisional patent application of co-pending U.S. patent application Ser. No. 12/967,181, entitled "Generating Targeted Group Based Offers to Increase Sales," filed Dec. 14, 2010, which is incorporated by reference herein. The present application claims priority benefits to U.S. patent application Ser. No. 12/967,181 under 35 U.S.C. §121.

TECHNICAL FIELD

The present invention relates to electronic commerce, and more particularly to generating targeted group based offers to increase sales.

BACKGROUND

Many retail merchants utilize an electronic commerce ("e-commerce") web site accessible through the Internet or World Wide Web through which customers can gather information and purchase products. Retailers, in an attempt to increase the number of online sales, may run various types of promotions, such as discount coupon codes, free shipping, etc.

However, these types of promotions are static in nature and do not necessarily take into account the real-time attributes/dynamics (e.g., simultaneous presence of customers online and/or in a physical store, quantity of product remaining in the inventory, strategy in selling current inventory) thereby negating the effectiveness of these promotions to translate into sales.

BRIEF SUMMARY

In one embodiment of the present invention, a method for increasing sales of a retailer comprises tracking the active presence of customers online, on mobile devices and in a physical store in connection with products being sold. The method further comprises generating a group offer for a set of users who are viewing a product online and/or on mobile devices and/or in the physical store to purchase the product based on intelligent analytics, where the group offer is an offer to sell the product at a promotional price in response to a number of the set of users agreeing to purchase the product at the promotional price within a time period. Additionally, the method comprises sending, by a processor of a retailer promotional device, the group offer to the set of users whose presence were tracked in connection with viewing the product across channels comprising online and/or on mobile devices and/or in the physical store.

Other forms of the embodiment of the method described above are in a system and in a computer program product.

In another embodiment of the present invention, a method for increasing sales of a retailer comprises receiving a request to partake in a group offer for a product via online, a mobile device, an electronic display or a kiosk, where the group offer is an offer to sell the product at a promotional price in response to a number of a set of users agreeing to purchase the product at the promotional price within a time period. The method further comprises providing a listing of users to receive the group offer who are currently viewing the product via online and/or on mobile devices and/or in a physical store. Additionally, the method comprises providing a listing of friends who are currently online on a social network of a user who initiated the request. Furthermore, the method comprises receiving a selection of users from the listing of users and the listing of friends to receive the group offer. In addition, the method comprises sending, by a processor of a retailer promotional device, the group offer to the selection of users across channels comprising online and/or on mobile devices and/or in the physical store and/or on the social network of the user who initiated the request.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
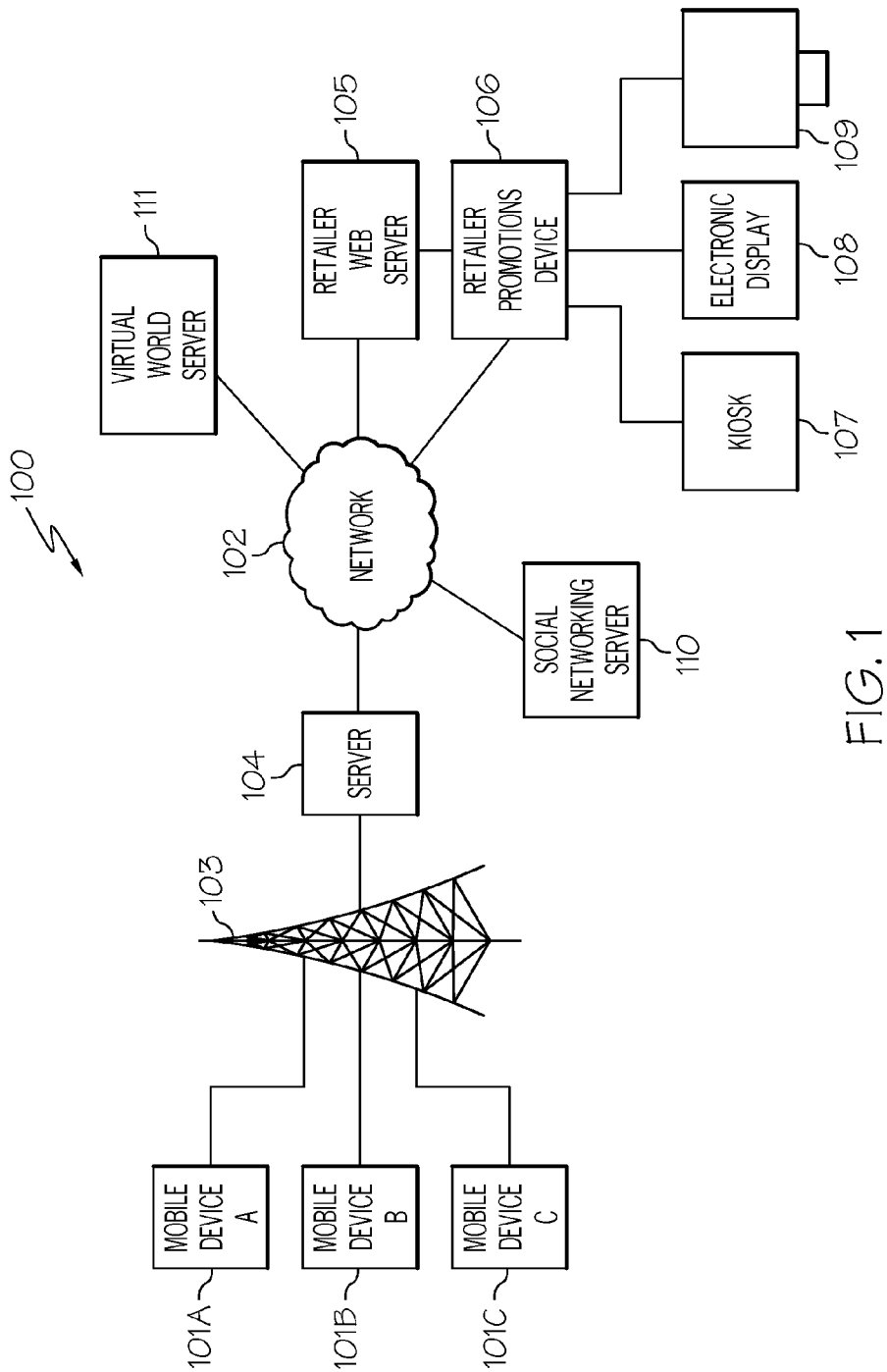
FIG. 1 illustrates an embodiment of the present invention of a retail network system for practicing the principles of the present invention.

Referring now to the Figures in detail, FIG. 1 illustrates an embodiment of the present invention of a retail network system 100 for practicing the principles of the present invention. Referring to FIG. 1, network system 100 includes one or more mobile devices ("Mobile Device A," "Mobile Device B," "Mobile Device C") 101A-101C connected to a network 102 (e.g., local area network, wide area network) via a wireless base station 103 which is connected to one or more servers 104 (e.g., proxy servers). Mobile devices 101A-101C may collectively or individually be referred to as mobile devices 101 or mobile device 101, respectively. Mobile device 101 can be any type of wireless communication device, such as but not limited to, a personal digital assistant, a mobile telephone, a blackberry device, a portable computer operating on a short-range wireless network, etc. Once mobile devices 101 are connected through wireless base station 103 and server 104, mobile device 101 can access web pages from a merchant via network 102 that is provided by a retailer web server 105 connected to network 102.

System 100 further includes a unit, referred to herein as the "retailer promotions device" 106, coupled to retailer web server 105 and network 102. A discussion regarding the hardware configuration of retailer promotions device 106 is provided further below in connection with FIG. 2. Retailer promotions device 106 is configured to generate group offers targeted to users of mobile devices 101 (whether within the physical store or not), to customers online (including, but not limited, to the retailer's website, social networking sites, virtual worlds), as well as to customers in the physical store (including multiple properties owned by the same retailer) using the principles of the present invention as discussed further below in connection with FIGS. 2-3, 4A-4B and 5. In one embodiment, the users of mobile devices 101 may receive the necessary retail application, with the user's permission, that allows the user's presence to be detected within the physical store. The group offer may also be sent to any other retailer related property, whether virtual (e.g., online) or physical through appropriate means. A group offer, as discussed herein, refers to an offer to sell a product at a promotional price if a number of users (users online and/or users of mobile devices 101 and/or customers in a physical store) agree to purchase the product at the promotional price within a time period (e.g., one hour). The term "online," as used herein, refers to activities that occur over a computer network, including, but not limited to, accessing a retailer's website, social network sites (e.g., social network sites operated by social network server 110), virtual worlds (e.g., virtual worlds operated by virtual world server 111), etc. Social network sites, virtual worlds, etc. are accessible by retailer promotions device 106 via network 102. The term "physical store," as used herein, refers to a brick and mortar store including the retailer's related properties.

As discussed above, retailer promotions device 106 is configured to generate group offers targeted to users of mobile devices 101, to customers online, as well as to customers in the physical store. Retailer promotions device 106 generates targeted group offers to customers in the physical store via mobile devices 101 located within the physical store, a kiosk 107 and an electronic display 108. Kiosk 107 is configured to display group offers as well as a place for a customer to register their interest in receiving group offer requests via kiosk 107, their mobile device 101, online or via an electronic display 108 placed at various locations in the physical store. Kiosk 107 and electronic display 108 may display the appropriate group offer to the appropriate customer anywhere in the physical store. In one embodiment, kiosk 107 and electronic display 108 serve as a place for customers to agree to be tracked in the physical store via a video camera 109 or other presence detection technologies, including, but not limited to, biometric scans, radio-frequency identification, near field communications, etc., for the purpose of potentially receiving a group offer. A description of tracking the presence of a customer in a physical store using these presence detection technologies are well known in the art and will not be provided herein for the sake of brevity. Each of these components, kiosk 107, electronic display 108 and video camera 109 are connected to retailer promotions device 106 by wire or wirelessly. The use of kiosk 107, electronic display 108 and video camera 109 in connection with generating targeted group offers will be discussed in further detail below in connection with FIGS. 3, 4A-B and 5.

Referring again to FIG. 1, system 100 is not to be limited in scope to any one particular network architecture, including any particular means for detecting the presence of users/customers. For example, system 100 may include traditional non-mobile devices (e.g., desktop personal computers) used by a customer to access the retailer's webstore, social networking sites, etc., whose presence is detected by retailer promotions device 106. System 100 may include any number of mobile devices 101, base stations 103, servers 104, retailer web servers 105, kiosks 107, electronic displays 108, video cameras 109, social networking servers 110 and virtual world severs 111.

Figure 2:
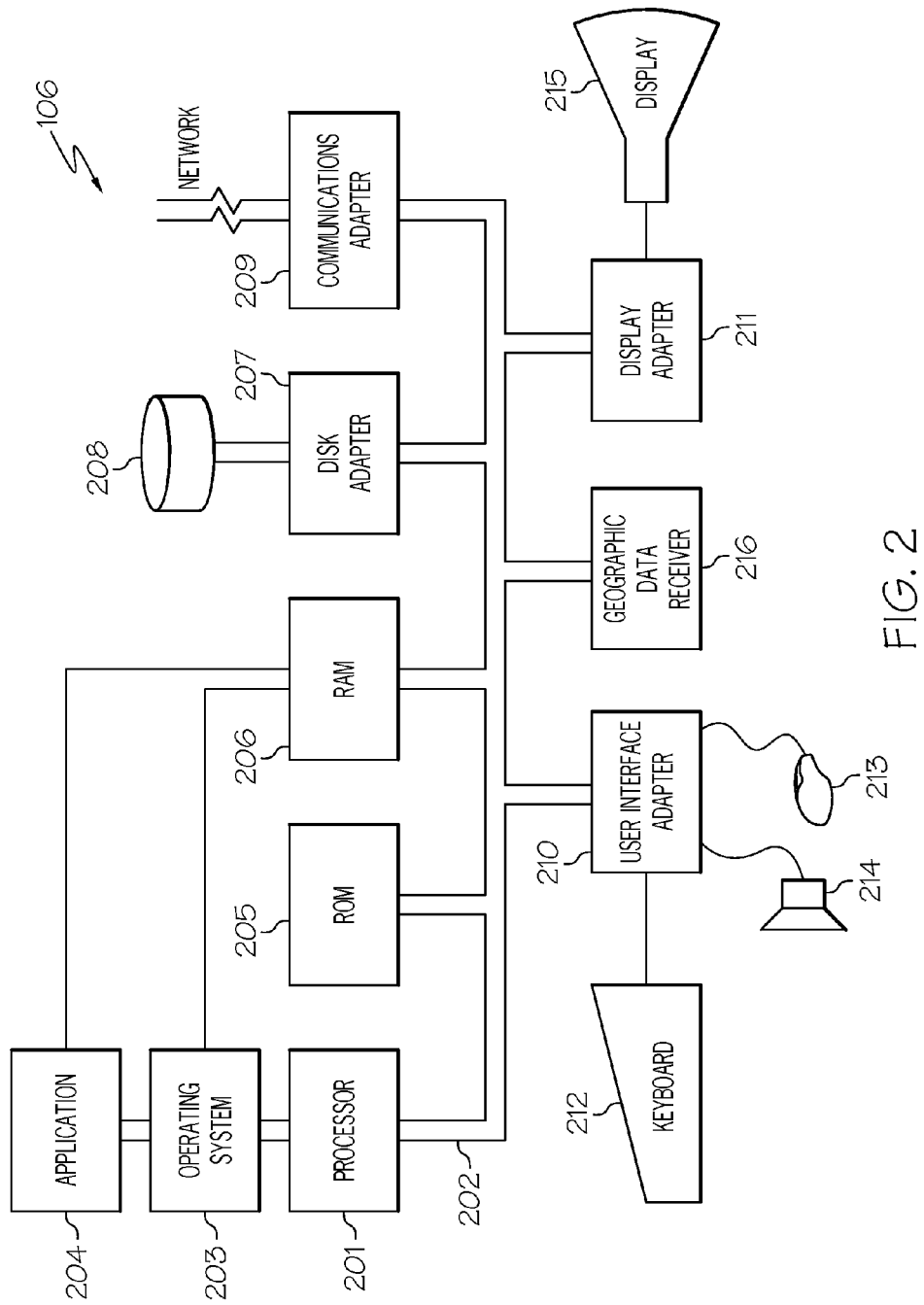
FIG. 2 illustrates the hardware configuration of a remote promotions device configured in accordance with an embodiment of the present invention.

Referring to FIG. 2, FIG. 2 illustrates an embodiment of a hardware configuration of retailer promotions device 106 (FIG. 1) which is representative of a hardware environment for practicing the present invention. Referring to FIG. 2, retailer promotions device 106 has a processor 201 coupled to various other components by system bus 202. An operating system 203 runs on processor 201 and provides control and coordinates the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a program for increasing the sales of a retailer by generating targeted group offers as discussed further below in association with FIGS. 3, 4A-4B and 5.

Referring again to FIG. 2, read-only memory ("ROM") 205 may be coupled to system bus 202 and include a basic input/output system ("BIOS") that controls certain basic functions of retailer promotions device 106. Random access memory ("RAM") 206 and disk adapter 207 may also be coupled to system bus 202. It should be noted that software components including operating system 203 and application 204 may be loaded into RAM 206, which may be retailer promotions device's 106 main memory for execution. Disk adapter 207 may be an integrated drive electronics ("IDE") adapter that communicates with a disk unit 208, e.g., disk drive. It is noted that the program for increasing the sales of a retailer by generating a targeted group offer as discussed further below in association with FIGS. 3, 4A-4B and 5, may reside in disk unit 208 or in application 204.

Retailer promotions device 106 may further include a communications adapter 209 coupled to bus 202. Communications adapter 209 may interconnect bus 202 with an outside network (not shown) thereby allowing retailer promotions device 106 to communicate with mobile devices 101, retailer web server 105, kiosk 107, electronic display 108, video camera 109, social network sites, virtual world sites, etc.

I/O devices may also be connected to retailer promotions device 106 via a user interface adapter 210 and a display adapter 211. Keyboard 212, mouse 213 and speaker 214 may all be interconnected to bus 202 through user interface adapter 210. Data may be inputted to retailer promotions device 106 through any of these devices. A display monitor 215 may be connected to system bus 202 by display adapter 211. In this manner, a user is capable of inputting to retailer promotions device 106 through keyboard 212 or mouse 213 and receiving output from promotions device 106 via display 215 or speaker 214.

Retailer promotions device 106 may further include a geographic data receiver 216 configured to receive geographic information from mobile devices 101 if such mobile devices 101 include a geographic data transceiver. As will be discussed in further detail below, such geographic information may be used by retailer promotions device 106 to track the presence of users within the physical store. The geographic information may include Global Positioning System ("GPS") data from a GPS transceiver included in mobile device 101. As is commonly known in the art, the GPS transceiver uses triangulation to determine its location. The GPS transceiver may relay position data to geographic data receiver 216, such as by using the NMEA 0183 protocol.

The hardware configuration of promotions device 106 is not to be limited in scope to any one particular architecture, such as the configuration illustrated in FIG. 2.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, retailers, in an attempt to increase the number of online sales, may run various types of promotions, such as discount coupon codes, free shipping, etc. However, these types of promotions are static in nature and do not necessarily take into account the real-time attributes/dynamics (e.g., simultaneous presence of customers online and/or in a physical store, quantity of product remaining in the inventory, strategy in selling current inventory) thereby negating the effectiveness of these promotions to translate into sales.

Figure 3:
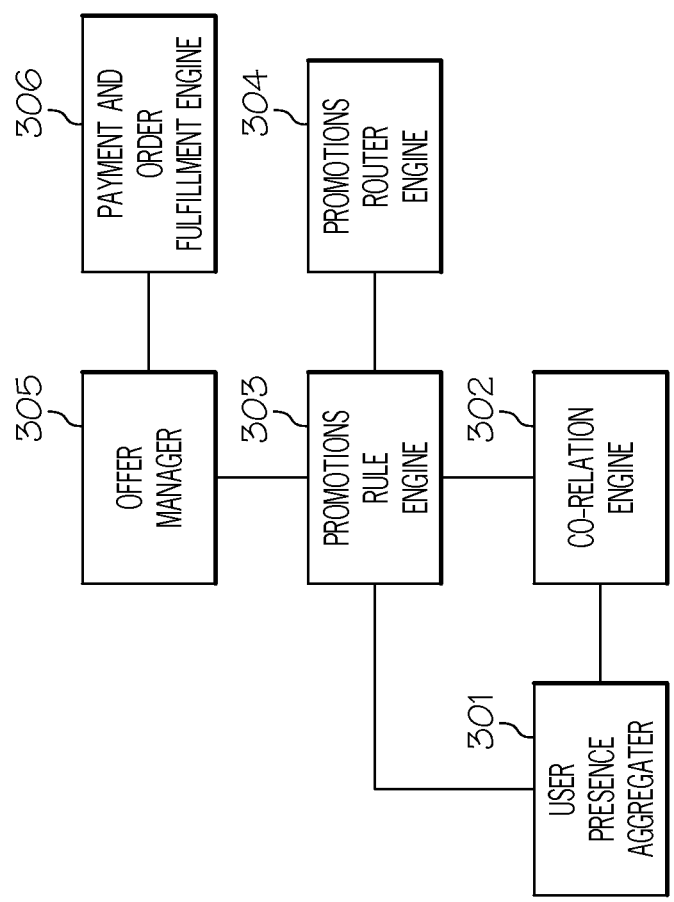
FIG. 3 illustrates the software components used in generating targeted group offers in accordance with an embodiment of the present invention.
Figure 4A:
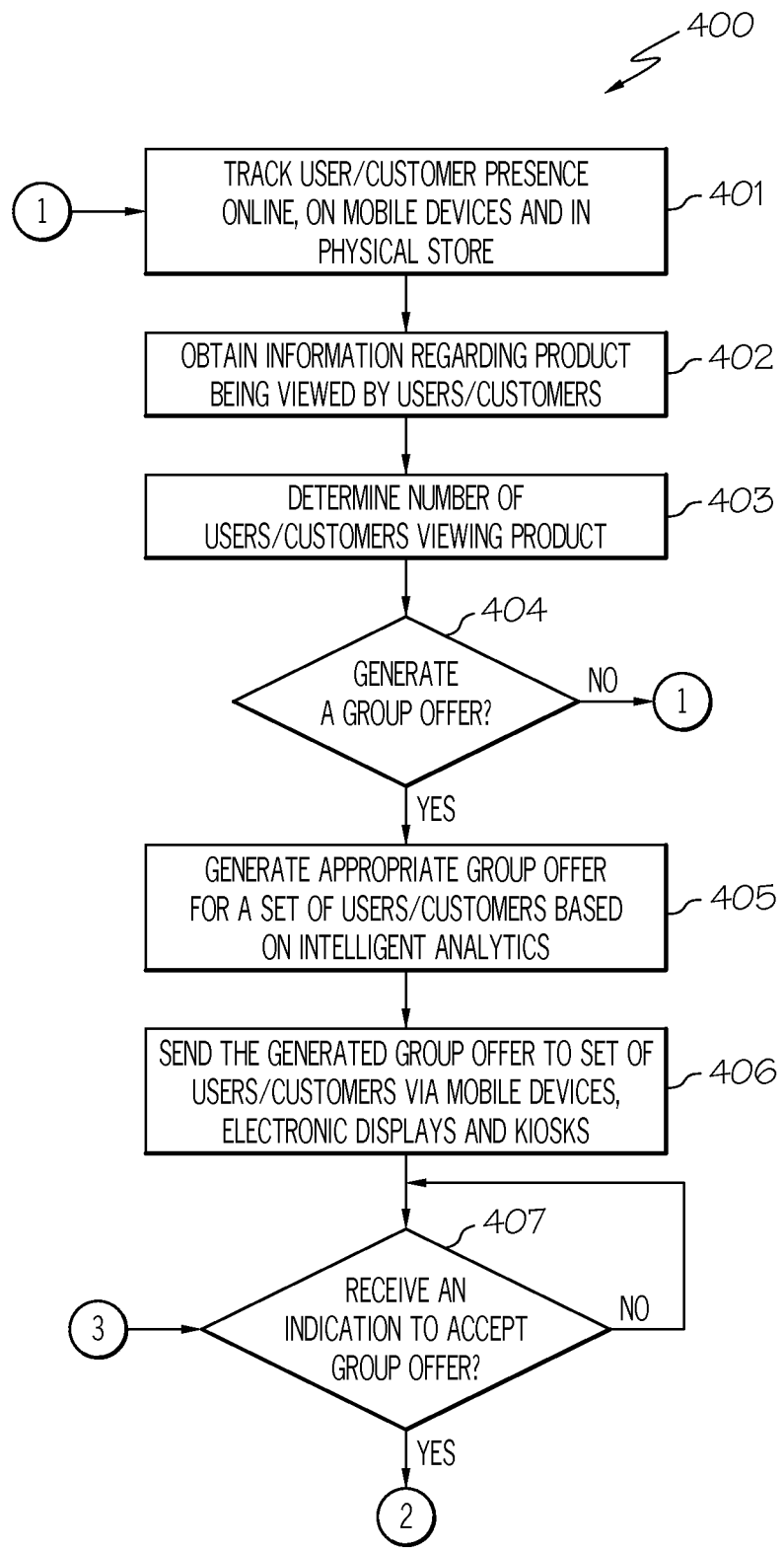
FIGS. 4A-4B are a flowchart of a method for increasing the sales of a retailer by generating targeted group offers in accordance with an embodiment of the present invention.
Figure 4B:
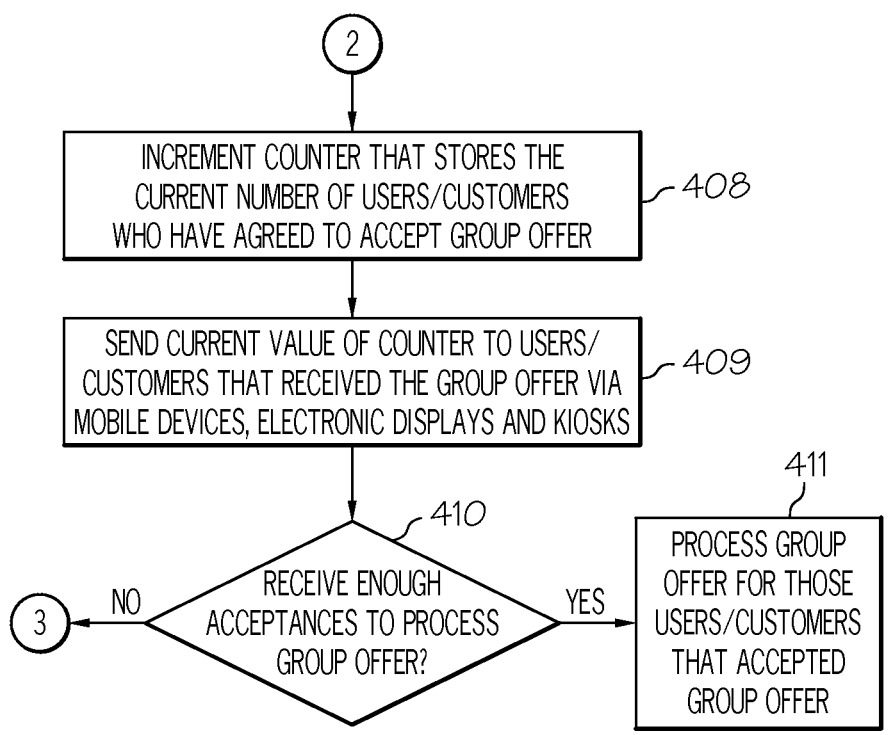
Figure 5:
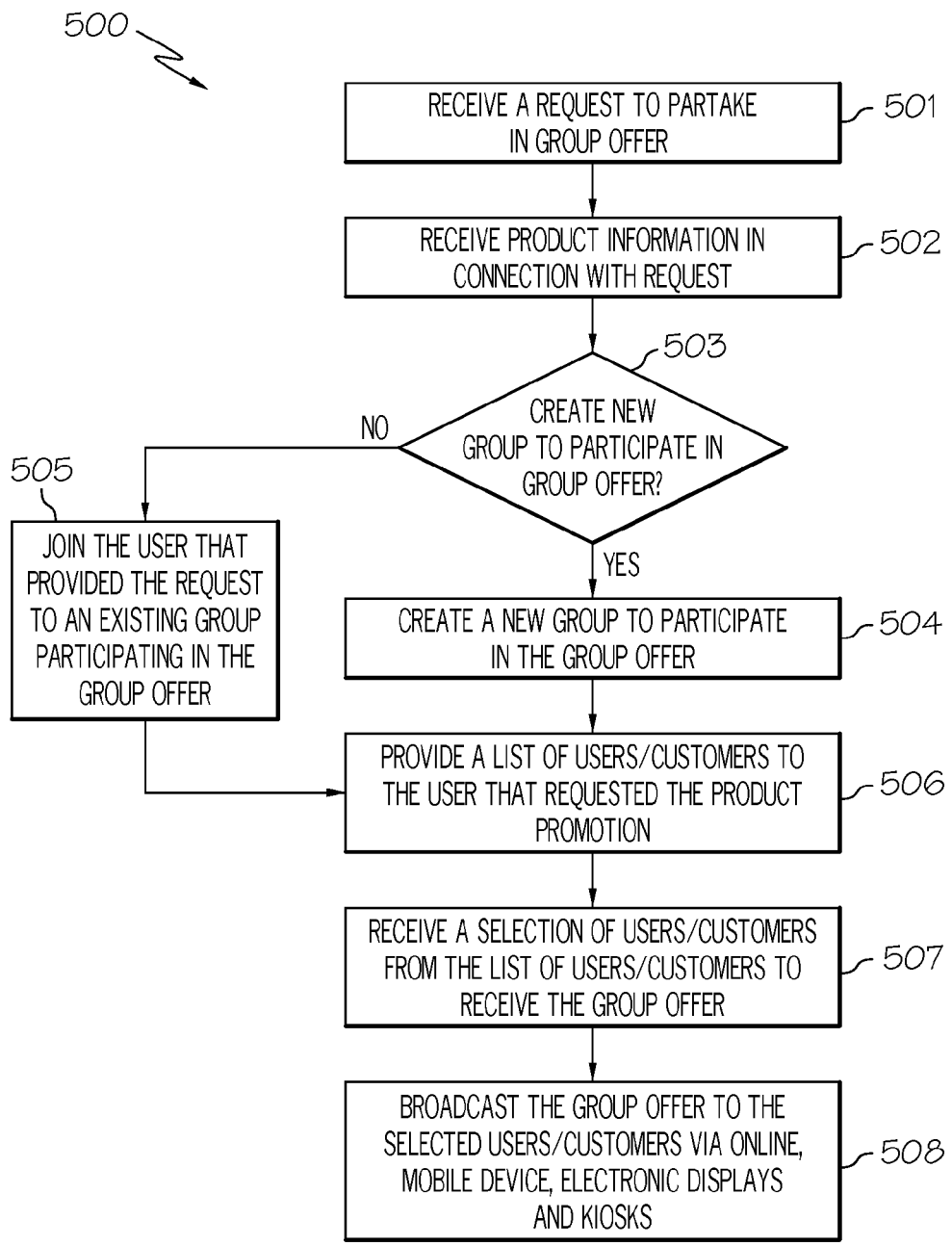
FIG. 5 is a flowchart of a method for extending a group offer to a requester and to invitees in accordance with an embodiment of the present invention.

The principles of the present invention increase the sales of a retailer by generating targeted group offers to users of mobile devices 101 (FIG. 1), to customers online, as well as to customers in the physical store as discussed below in connection with FIGS. 3, 4A-B and 5. FIG. 3 illustrates the software components used in generating targeted group offers to users of mobile devices 101 as well as to customers online and in the physical store. FIGS. 4A-4B are a flowchart of a method for increasing the sales of retailer by generating targeted group offers. FIG. 5 is a flowchart of a method for extending a group offer to a requester and to selected active invitees in the context of the retailer and the social network of the requester.

Referring to FIG. 3, as stated above, FIG. 3 illustrates the software components used in generating targeted group offers to users of mobile devices 101 (FIG. 1), to customers online and to customers in the physical store in accordance with an embodiment of the present invention. In one embodiment, these software components are the components or modules of the program for increasing the sales of a retailer by generating a targeted group offer, where the program may reside in application 204 (FIG. 2).

The following provides a brief description of these software components. A more detailed description of these software components is provided in conjunction with FIGS. 4A-4B and 5, where their functionalities are discussed in connection with the methods for increasing the sales of a retailer through the generation of targeted group offers.

Referring again to FIG. 3, the software components include a user presence aggregator 301 configured to track the presence of users online (e.g., retailer's website, social network sites, virtual worlds), the presence of users on mobile devices 101 (e.g., mobile device 101 may receive an application from the retailer that allows it to be tracked) as well as the presence of customers in a physical store (e.g., customers in a physical store may be tracked via video information received from video cameras 109 and/or geographic data received from a geographic data transceiver in mobile device 101, or other presence detection technologies, including, but not limited to, biometric scans, radio-frequency identification, near field communications, etc.).

User presence aggregator 301 is connected to a co-relation engine 302, which is configured to detect the presence of other users to receive the group offer, such as using the buddy list in the user's/customer's social profile, those users/customers that are nearby the product of the group offer in the physical store or the (product/related product/category/promotions) page/property in an online scenario. Co-relation engine 302 is connected to promotions rule engine 303, which is configured to generate appropriate group offers based on intelligent analytics.

Promotions rule engine 303 is connected to promotions router engine 304, which is configured to send the group offers, such as via online, mobile device 101, electronic display 108 and kiosk 107, to customers based on their presence detected by presence aggregator 301. Promotions rule engine 303 is further connected to offer manager 305, which is configured to manage the lifecycle of the group offer as well as configured to track the number of current users who have accepted the group offer through a counter (implemented in software, hardware or combination).

Additionally, the software components include a payment and order fulfillment engine 306 connected to offer manager 305, where payment and order fulfillment engine 306 is configured to process the group offer to those users that accepted the group offer after the required number of acceptances of the group offer.

As stated above, a more detail description of the functionality of these software components is provided below in connection with FIGS. 4A-4B and 5.

FIGS. 4A-4B are a flowchart of a method for increasing the sales of retailer by generating targeted group offers to users of mobile devices 101 (FIG. 1), to customers online and to customers in the physical store in accordance with an embodiment of the present invention.

Referring to FIG. 4A, in conjunction with FIGS. 1-3, in step 401, user presence aggregator 301 tracks the active presence of customers online, on mobile devices 101 and in the physical store in connection with products being sold by the retailer. For example, the presence of customers may be tracked on the product page of the retailer's webstore. The presence of customers may also be tracked based on the category of the merchandise being viewed by the customers online, on mobile devices 101 and/or in the physical store. The presence of customers may also be tracked based on the product rack being viewed by the customers in the physical/virtual store.

In step 402, promotions rule engine 303 obtains information regarding the product being viewed by users/customers online, on mobile devices 101 and in the physical store. For example, promotions rule engine 303 may obtain the current inventory of the product, the product price over time, the product inventory strategy (e.g., need to sell the current inventory of leather shoes before the monsoon season), etc. As explained in further detail below, the information acquired by promotions rule engine 303 is used to generate an appropriate group offer as well as if such a group offer should be made to customers online and/or users of mobile device 101 and/or customers in the physical store whose presence are being tracked in step 401. A group offer, as used herein, refers to an offer to sell a product at a promotional price if a number of online customers and/or users of mobile devices 101 and/or customers in the physical store agree to purchase the product at the promotional price within a time period (e.g., one hour). One such instantiation of a group offer may straddle users across online, the physical store or the mobile channel. That is, the group of users/customers in the group offer may be spread across the physical store, online store/properties or mobile touch-points.

In step 403, user presence aggregator 301 determines the number of customers viewing the product online, including the users of mobile devices 101, and the number of customers who are in the physical store that are currently viewing the same product.

In step 404, a determination is made by promotions rule engine 303 as to whether to generate a group offer based on intelligent analytics. Intelligent analytics may include, but not limited to, the number of users/customers currently viewing the product whether online, via mobile device 101 or in the physical store (obtained in step 403), heuristic as to how many of these users/customers would actually purchase the product at a given price, number of users/customers who expressed interest in taking part in group offers, number of users/customers who expressed interest in accepting a proposed group offer for the product, the product, the inventory of the product, the strategy in selling the product (e.g., sell current inventory of leather shoes before monsoon season), user/customer preferences derived from social profiles and other means (e.g., image context of upload images, past purchase history, wish list contents, chat contents), preferences of the friends of the users/customers whose presence are tracked in step 401 (friends of the users/customers whose presence are tracked in step 401 could be obtained from the buddy list in the user's/customer's social profile), preference of the merchant to make a targeted combined offer, etc.

If promotions rule engine 303 determines not to generate a group offer, then, user presence aggregator 301 continues to track the presence of customers online, on mobile devices 101 and in the physical store in connection with products being sold by the retailer in step 401.

If, however, promotions rule engine 303 determines to generate a group offer based on intelligent analytics, then, in step 405, promotions rule engine 303 generates an appropriate group offer for a set of customers online and/or users of mobile devices 101 and/or customers in the physical store based on the intelligent analytics discussed above.

In step 406, promotions router engine 304 sends the group offer to this set of users/customers across various channels, including, but not limited to, online, mobile devices 101, electronic displays 108 and kiosks 107. In one embodiment, the group offer is displayed to the user/customer as a message (e.g., a pop-up message). In one embodiment, the user/customer can indicate an acceptance of the group offer by selecting an option to accept the group offer being displayed in the message. In one embodiment, the message includes a list of users who received the group offer. In a further embodiment, the message includes an ability to start instant chat with any of the users in the list. In one embodiment, a customer may receive a notification on his/her mobile device 101 if the customer has left the physical store after looking at the product and not purchasing it.

In one embodiment, the group offer is displayed at electronic displays 108 which are placed throughout the physical store, such as near the product being offered for sale in the group offer. In one embodiment, kiosks 107 are placed throughout the physical store, including one being placed at the entrance of the physical store for customers to view the group offers currently being offered by the retailer. In one embodiment, the customers in the physical store may indicate an acceptance of the group offer by selecting an option to accept the group offer being displayed at electronic displays 108, kiosks 107. The group offers being displayed at electronic displays 108, kiosks 107 may include a list of other users/customers that received the group offers in question. In one embodiment, contact information for these users/customers may be made available in connection with these group offers provided the merchant received prior approval by the user/customer. In one embodiment, kiosks 107, electronic displays 108 are further presence enabled where there is coordination with user presence aggregator 301 to display the group offer at kiosks 107, electronic displays 108 at which the user presence is detected.

In step 407, a determination is made by promotions rule engine 303 as to whether retailer promotions device 106 received an indication to accept the group offer from one of the users/customers who received the group offer in step 406.

If retailer promotions device 106 did not receive an acceptance of the group offer from any of the users/customers who received the group offer in step 406, then, promotions rule engine 303 makes a subsequent determination in step 407 as to whether retailer promotions device 106 received an indication to accept the group offer from one of the users/customers who received the group offer in step 406.

Referring to FIG. 4B, in conjunction with FIGS. 1-3, if, however, retailer promotions device 106 received an acceptance of the group offer from one of the user/customers that received the group offer, then, in step 408, offer manager 305 increments a counter (can be implemented in software, hardware or a combination) that stores the current number of users who have agreed to accept the group offer.

In step 409, offer manager 305 sends the current value of the counter to the users/customers that received the group offer via online, mobile devices 101, electronic displays 108 and kiosks 107.

In step 410, a determination is made by offer manager 305 as to whether retailer promotions device 106 received enough acceptances (a threshold number of acceptances) to process the group offer. As discussed above, if a particular number of users/customers that received the group offer agree to purchase the product at the promotional price provided in the group offer within a time period (e.g., one hour), then the group offer is processed. That is, those users/customers that accepted the group offer would be able to purchase the product at the promotional price if the threshold number of users/customers who received the group offer decided to accept the group offer.

If retailer promotions device 106 received the threshold number of acceptances of the group offer within its designated time, then, in step 411, payment and order fulfillment engine 306 processes the group offer for those users/customers that accepted the group offer. In the manner described above, the group offer may be instantly realized without the users/customers waiting for days.

If, however, retailer promotions device 106 did not receive the threshold number of acceptances of the group offer within its designated time, then, promotions rule engine 303 makes a subsequent determination in step 407 of FIG. 4A as to whether retailer promotions device 106 received an indication to accept the group offer from one of the users/customers who received the group offer in step 406.

In some implementations, method 400 may include other and/or additional steps that, for clarity, are not depicted. Further, in some implementations, method 400 may be executed in a different order presented and that the order presented in the discussion of FIGS. 4A and 4B is illustrative. Additionally, in some implementations, certain steps in method 400 may be executed in a substantially simultaneous manner or may be omitted.

In addition to retailer promotions device 106 displaying the group offer to those users/customers that are believed to be interested in receiving a group offer for a product, a customer may issue a request to retailer promotions device 106 for a product promotion (e.g., group offer) on a designated product as discussed below in connection with FIG. 5.

FIG. 5 is a flowchart of a method 500 for extending a group offer to a requester and to invitees in accordance with an embodiment of the present invention.

Referring to FIG. 5, in conjunction with FIGS. 1-3, in step 501, promotions rule engine 303 receives a request for a product promotion, such as a group offer, from a customer by the customer selecting the group offer displayed online, on mobile device 101, at electronic display 108 or at kiosk 107. In one embodiment, the user of mobile device 101 (including the necessary application installed) may swipe mobile device 101 against the group offer being displayed (e.g., electronic display 108, kiosk 107) that will indicate that the user requests to participate in the group offer.

In step 502, promotions rule engine 303 receives product information for the product in connection with the request of step 501. In one embodiment, the product information is provided by the user of mobile device 101 via a bar code scanner. In one embodiment, the product information provided by the bar code scanner is attached to the request of step 501.

In step 503, promotions rule engine 303 determines whether to create a new group to participate in the group offer or to join the user that provided the request in step 501 to an existing group participating in the group offer. In one embodiment, if the user that requested the group offer in step 501 is the first user to request such a group offer, then, in step 504 promotions rule engine 303 creates a new group to participate in the group offer. Otherwise, in step 505, promotions rule engine 303 joins the user that provided the request in step 501 to an existing group participating in the group offer. In one embodiment, the user may be presented with an option as to whether to join a pre-existing group participating in the group offer or to create a new group, even if there exists a pre-existing group participating in the group offer.

Upon creating a new group to participate in the group offer in step 504 or upon joining the user that provided the request in step 501 to an existing group participating in the group offer in step 505, in step 506, promotions rule engine 303 provides one or more lists of users/customers to the user that requested the product promotion in step 501. In one embodiment, a list of users/customers may include those who are currently viewing the product of the group offer online, on mobile devices 101 and/or in the physical. Furthermore, a list of users/customers may include those who are currently online, such as friends of the customer who requested the group offer in step 501, but who may never have shopped at this particular retailer or viewed the product of the group offer.

In step 507, promotions rule engine 303 receives a selection of other users/customers to receive the group offer. In one embodiment, the user selects users/customers to receive the group offer out of one or more lists of users/customers provided to the user in step 506. In one embodiment, this selection is made by the customer who requested the group offer in step 501 via online, mobile device 101, electronic display 108 and kiosk 107. For example, mobile device 101, electronic display 108, kiosk 107, retailer's webstore, etc., may include a listing of individuals in the physical store who have indicated that they would like to be contacted for group offers. Other examples, where the users may be active in the store, include a listing of users of mobile devices 101 (with their permission) who are currently online and have viewed or are currently viewing the product related to the group offer, a listing of individuals who have registered themselves to receive any kind of group offer request, a listing of users who have shown an affinity for group offers, a listing of users who have previously viewed the product of the group offer in the past but have not purchased the product and are currently online, a listing of individuals (with their permission) who have the product related to the group offer listed in their wishlist and are online, and a listing of such active consumers/friends online on the user's social network.

In step 508, offer manager 305 broadcasts the group offer to these users/customers (i.e., the selected users/customers from step 507) via online, mobile device 101, electronic displays 108 and kiosks 107 to expand the group across different channels. As discussed above, the group offer is offered across many different channels, including, but not limited to, across different retailer properties to such active users previously selected.

As also discussed above, the group offer displayed to these selected users/customers, such as in a message format, may include a list of users who received the group offer as well as the ability to start instant chat with any of the users in the list. In this manner, users/customers can seek an immediate response as to whether they would be interested in accepting the group offer or if they wish to discuss anything among fellow members.

In connection with retailer promotions device 106 receiving responses from these invitees, steps 407-411 of FIGS. 4A and 4B are applicable.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

While the term "customer" has been used to refer to those individuals who are physically present in the store and the term "user" has been used to refer to those individuals who are users of mobile devices 101, these terms may be used interchangeably and are not to be limiting, including in the appended claims.

Furthermore, it is assumed herein that users or customers that are tracked and received targeted group offers have granted permission to be tracked and receive targeted group offers.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for increasing sales of a retailer, the method comprising:
   receiving a request to partake in a group offer for a product via one of online, a mobile device, an electronic display and a kiosk, wherein said group offer is an offer to sell said product at a promotional price in response to a number of a set of users agreeing to purchase said product at said promotional price within a time period;
   providing a listing of users to receive said group offer who are currently viewing said product via one or more of online, on mobile devices, and in a physical store;
   providing, by a processor of a retailer promotions device, a listing of friends who are currently online on a social network of a user who initiated said request;
   receiving a selection of users from said listing of users and said listing of friends to receive said group offer; and
   sending said group offer to said selection of users across channels comprising one or more of online, on said mobile devices, in said physical store and on said social network of said user who initiated said request.

2. The method as recited in claim 1, wherein said request to partake in said group offer occurs by a user of said mobile device swiping said mobile device against said group offer being displayed at one of said electronic display and said kiosk.

3. A computer program product for increasing sales of a retailer, the computer program product comprising a non-transitory computer readable storage medium having program code embodied therewith, the program code comprising the programming instructions for:
   receiving a request to partake in a group offer for a product via one of online, a mobile device, an electronic display and a kiosk, wherein said group offer is an offer to sell said product at a promotional price in response to a number of a set of users agreeing to purchase said product at said promotional price within a time period;
   providing a listing of users to receive said group offer who are currently viewing said product via one or more of online, on mobile devices, and in a physical store;
   providing a listing of friends who are currently online on a social network of a user who initiated said request;
   receiving a selection of users from said listing of users and said listing of friends to receive said group offer; and
   sending said group offer to said selection of users across channels comprising one or more of online, on said mobile devices, in said physical store and on said social network of said user who initiated said request.

4. The computer program product as recited in claim 3, wherein said request to partake in said group offer occurs by a user of said mobile device swiping said mobile device against said group offer being displayed at one of said electronic display and said kiosk.

5. A system, comprising:
   a memory unit for storing a computer program for increasing sales of a retailer; and a processor coupled to said memory unit, wherein said processor is configured to execute the program instructions of the computer program comprising:

receiving a request to partake in a group offer for a product via one of online, a mobile device, an electronic display and a kiosk, wherein said group offer is an offer to sell said product at a promotional price in response to a number of a set of users agreeing to purchase said product at said promotional price within a time period;

providing a listing of users to receive said group offer who are currently viewing said product via one or more of online, on mobile devices, and in a physical store;

providing a listing of friends who are currently online on a social network of a user who initiated said request;

receiving a selection of users from said listing of users and said listing of friends to receive said group offer; and sending said group offer to said selection of users across channels comprising one or more of online, on said mobile devices, in said physical store and on said social network of said user who initiated said request.

6. The system as recited in claim 5, wherein said request to partake in said group offer occurs by a user of said mobile device swiping said mobile device against said group offer being displayed at one of said electronic display and said kiosk.

* * * * *